F. HELMICK.
CAR WHEEL BEARING RETAINER.
APPLICATION FILED APR. 9, 1918.
1,325,153.
Patented Dec. 16, 1919.
2 SHEETS—SHEET 1.
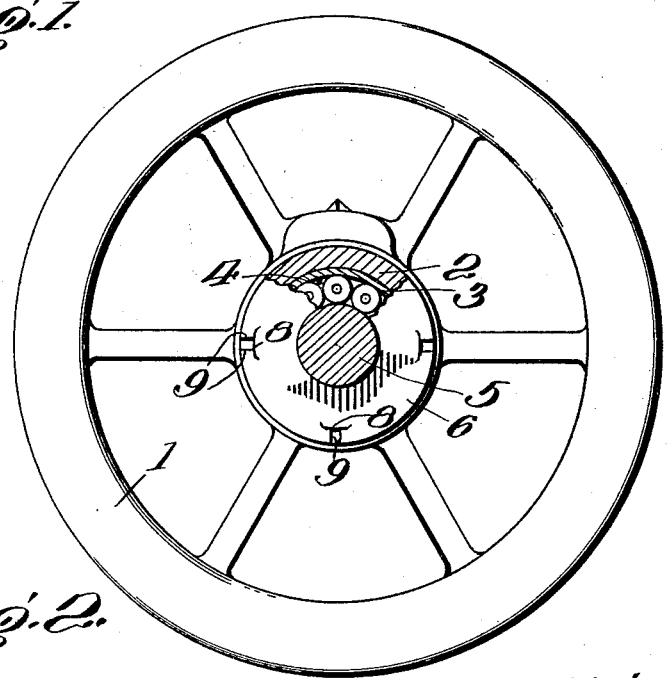
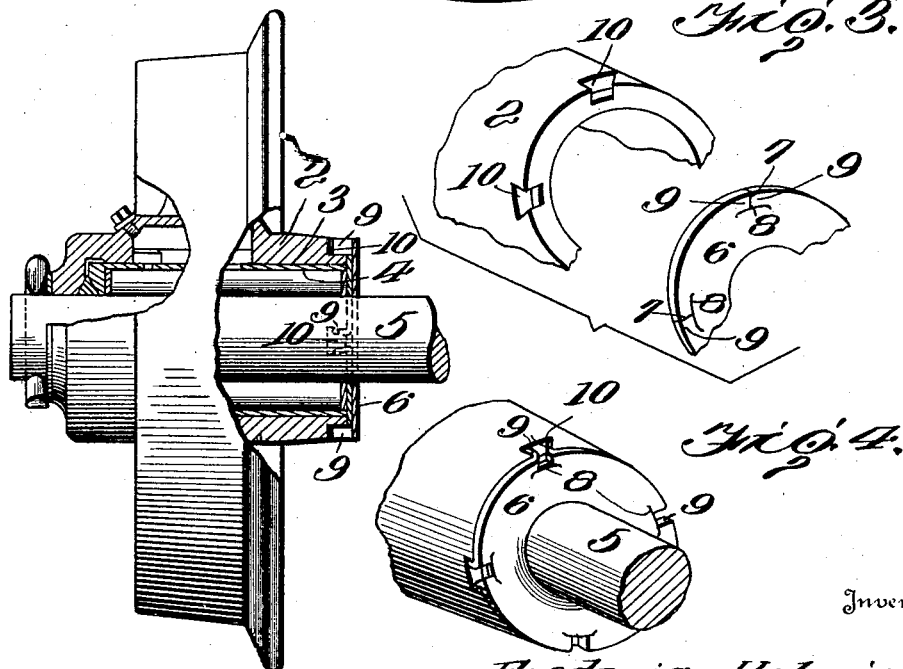
Inventor
Frederic Helmick.
By
Attorney

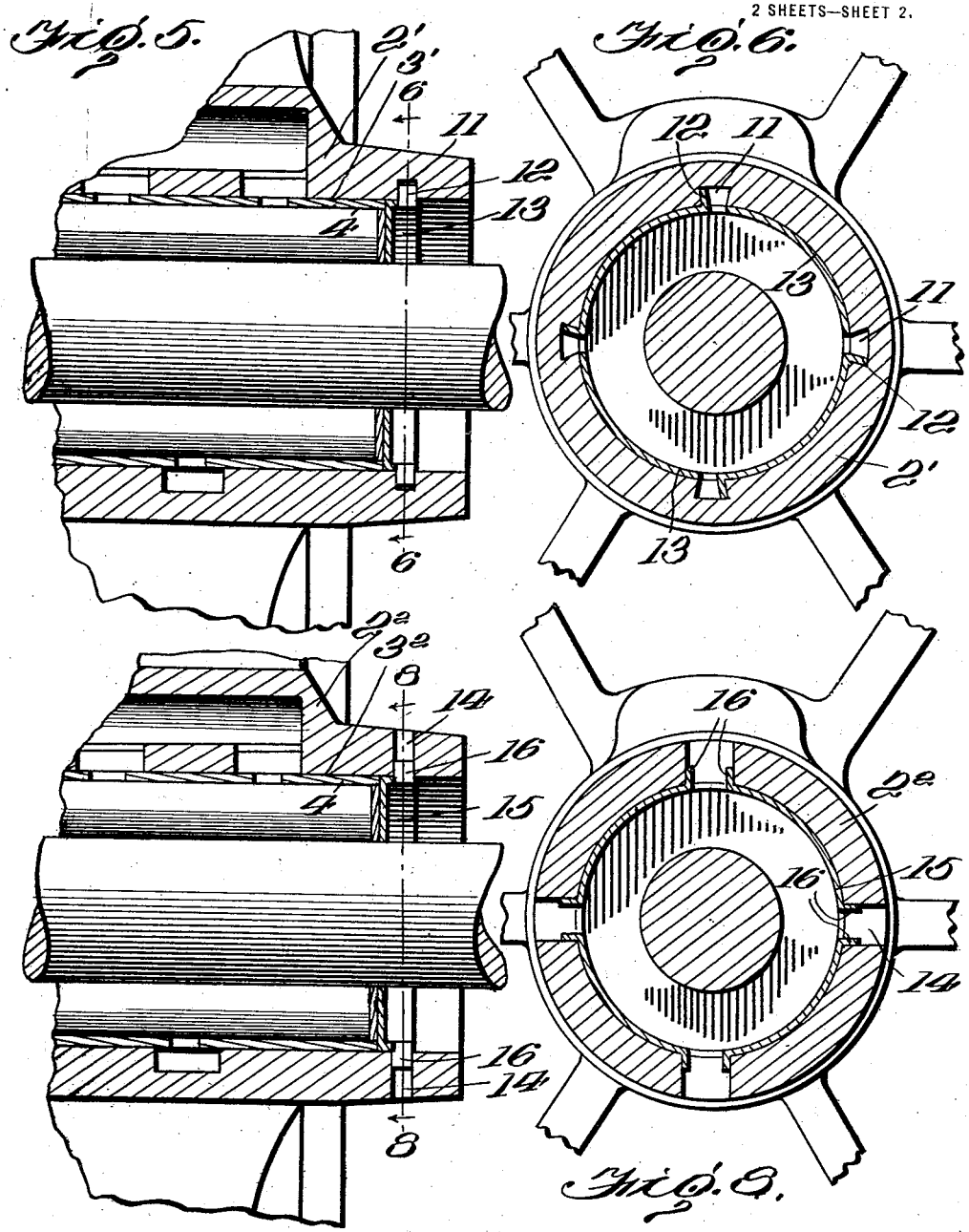

UNITED STATES PATENT OFFICE.

FREDERIC HELMICK, OF FAIRMONT, WEST VIRGINIA, ASSIGNOR TO HELMICK FOUNDRY MACHINE COMPANY, OF FAIRMONT, WEST VIRGINIA, A CORPORATION OF WEST VIRGINIA.

CAR-WHEEL-BEARING RETAINER.

1,325,153.  Specification of Letters Patent.  Patented Dec. 16, 1919.

Application filed April 9, 1918. Serial No. 227,536.

*To all whom it may concern:*

Be it known that I, FREDERIC HELMICK, a citizen of the United States, residing at Fairmont, in the county of Marion and State of West Virginia, have invented certain new and useful Improvements in Car-Wheel-Bearing Retainers, of which the following is a specification, reference being had therein to the accompanying drawing.

This invention relates to certain new and useful improvements in car wheels and more particular to means for retaining the roller bearing within the hub of the wheel, the object being to provide a retaining member which can be secured to the hub of the wheel without the use of bolts or screws.

Another object of my invention is to provide a retaining member for the roller bearing cage which is provided with integral tongues adapted to be forced into recesses formed in the hub so as to prevent longitudinal movement of the cage within the hub.

Another and further object of the invention is to provide a car wheel bearing retainer which is exceedingly simple and cheap in construction, and one which can be readily installed in the ordinary car wheel now in use.

Other and further objects and advantages of the invention will be hereinafter set forth and the novel features thereof defined by the appended claims.

In the drawings,

Figure 1 is a side elevation of a car wheel partly in section showing the application of my improved construction of bearing retainer thereto.

Fig. 2 is an elevation partly in section showing the roller bearing cage, retainer and bearing washer.

Fig. 3 is a detail perspective view of a portion of the hub and retaining member separated.

Fig. 4 is a detail perspective view showing the tongues of the retaining member forced into the grooves or recesses of the hub.

Fig. 5 is a vertical section through a hub showing another form of retaining member.

Fig. 6 is a section taken on line 6—6 of Fig. 5.

Fig. 7 is a longitudinal section through a hub showing still another form of retaining member; and Fig. 8 is a section taken on line 8—8 of Fig. 7.

Like numerals of reference refer to like parts in the several figures of the drawing.

In the drawing 1 indicates a wheel body which is provided with the usual hub 2 having a bore 3 in which is arranged a roller bearing cage 4 provided with the usual roller bearings to receive the axle 5. The particular construction of roller bearings and the manner of securing the axle within the hub forms no part of this application as the roller bearing construction is shown in my companion application executed even date herewith.

In the form of retaining member shown in Figs. 1 to 4, I employ a ring 6 which is split radially, as shown at 7 and annularly as shown at 8 in order to provide tongues 9 which are adapted to be forced into recesses 10 formed in the inner end of the hub 2, as clearly shown in Figs. 1 and 4. The recesses 10 are preferably formed dove-tail shaped so that when the tongues 9 of the retaining ring 6 are forced into the same, the retaining ring will be held firmly against the inner end of the hub to prevent longitudinal movement of the roller bearing cage 4.

It will be seen that by this construction the roller bearing cage can be secured within the hub of the wheel without the use of screws or bolts, and when it is desired to remove the bearing cage for any purpose, the tongues which have been crimped within the recesses can be readily forced together in order to allow the ring to be removed.

In the form of retaining rings shown in Figs. 5 and 6, the hub 2' of the wheel is provided with a bore 3' having oppositely disposed recesses 11 to receive the tongues 12 of retaining member 13 which is in the form of a cup and has its annular flanges split radially and annularly to form the tongues 12 which are forced into the recesses 11 after the retaining member has been placed in position within the bore of the hub so as to prevent the bearing cage from moving longitudinally within the bore. It will be noted that in this construction, that instead of forming the tongues in pairs, that a single tongue is formed on the flange and that it is not necessary to form the recesses in the hub dove-tail in shape.

In the form of retaining members shown in Figs. 7 and 8, the hub $2^2$ is provided with a bore $3^2$ to receive the bearing cage, and has formed through its wall recesses 14 which extend entirely through the hub for the purpose hereinafter fully described. After the bearing cage 4 has been placed in position with the bore of the hub, the cup-shaped bearing retainer 15 is placed within the bore having its annular flange split to form tongues 16 which are forced into the recesses 14, by any suitable means, so as to fasten the retaining member within the hub in order to prevent the bearing cage from moving longitudinally therein. By forming the recesses in this construction in the form of openings, which extend to the exterior of the hub, a suitable implement can be inserted through the openings so as to force the tongues out of the openings in order to allow the retaining member to be removed.

From the foregoing description it will be seen that I have provided a car wheel with a roller bearing cage retained within the bore of the hub by a retaining member which is split to form retaining tongues for securing the retaining member to the hub, and while I have shown several ways of accomplishing the desired result by forming a retaining member with integral tongues, I do not wish to limit myself to the details of construction shown.

I claim:

1. A car wheel having a hub provided with a bore annularly enlarged at its inner end forming a shoulder and provided with recesses at its outer end, a roller bearing cage mounted within the enlarged portion of said bore against said shoulder, and a retaining member arranged to engage said bearing cage, said retaining member having integral malleable fastening members adapted to be bent into said recesses for securing the same to the hub of said wheel.

2. A car wheel having a hub provided with a bore and recesses, a roller bearing cage mounted within said bore and a retaining member mounted to engage said bearing cage having tongues adapted to be expanded within said recesses.

3. A car wheel having a hub provided with an enlarged bore at one end to receive a roller bearing cage, said hub having recesses and a retaining member arranged to engage said bearing cage having malleable tongues adapted to be forced within said recesses for securing said retaining member to said hub.

4. A car wheel having a hub provided with a bore to receive an axle at its outer end, said bore being enlarged at its inner end, a roller bearing cage arranged within the enlarged portion of said bore against the shoulder formed thereby, said hub having substantially dove-tail shaped recesses, a ring-shaped retaining member arranged against said bearing cage, said retaining member being split to form spaced tongues adapted to be forced within said recesses for securing said retaining member to said hub.

5. A car wheel having a hub provided with a bore to receive an axle at its outer end and having an enlarged bore at its inner end to receive a roller bearing cage, a ring shaped retaining member arranged against said bearing cage, said hub having substantially dove-tail shaped recesses, the outer edge portion of said retaining member being split to form spaced tongues adapted to be forced within said recesses for securing said retaining member to said hub.

In testimony whereof I hereunto affix my signature in the presence of two witnesses.

FREDERIC HELMICK.

Witnesses:
W. B. CROWL,
JOHN P. JONES.